United States Patent
Zheng et al.

(10) Patent No.: US 12,379,227 B2
(45) Date of Patent: Aug. 5, 2025

(54) NAVIGATION SYSTEM WITH SEMANTIC MAP PROBABILITY MECHANISM AND METHOD OF OPERATION THEREOF

(71) Applicant: TeleNav, Inc., Santa Clara, CA (US)

(72) Inventors: Xuehe Zheng, Shanghai (CN); Wei Long, Shanghai (CN); Congmin Bai, Shanghai (CN)

(73) Assignee: Telenav, Inc., Santa Clara, CA (US)

( * ) Notice: Subject to any disclaimer, the term of this patent is extended or adjusted under 35 U.S.C. 154(b) by 270 days.

(21) Appl. No.: 18/117,231

(22) Filed: Mar. 3, 2023

(65) Prior Publication Data
US 2024/0295413 A1    Sep. 5, 2024

(51) Int. Cl.
*G01C 21/00*    (2006.01)
*G01C 21/32*    (2006.01)
(Continued)

(52) U.S. Cl.
CPC ......... *G01C 21/3889* (2020.08); *G01C 21/32* (2013.01); *G01C 21/3602* (2013.01);
(Continued)

(58) Field of Classification Search
CPC ............... G01C 21/3889; G01C 21/32; G01C 21/3602; G01C 21/3878; G06T 7/73; G06T 2207/10028; G06T 2207/30252
See application file for complete search history.

(56) References Cited

U.S. PATENT DOCUMENTS 7,446,766 B2 * 11/2008 Moravec .............. G06V 20/10
352/57
8,427,472 B2 * 4/2013 Moravec .............. G05D 1/0274
435/325
(Continued)

FOREIGN PATENT DOCUMENTS

CN    105354591 A    2/2016
CN    108920584 A    11/2018
(Continued)

OTHER PUBLICATIONS

Bieder, Frank, et al. "Exploiting multi-layer grid maps for surround-view semantic segmentation of sparse lidar data." 2020 IEEE Intelligent Vehicles Symposium (IV). IEEE, 2020. (Year: 2020).*

*Primary Examiner* — Christian Chace
*Assistant Examiner* — Ricahrd E Geist
(74) *Attorney, Agent, or Firm* — Perspectives Law Group, Corp.

(57) ABSTRACT

A navigation system includes: a control circuit configured to: a control circuit configured to: capture a semantic frame from a sensor data stream for a region of interest, crop an outer peripheral edge of the semantic frame by removing semantic points beyond the outer peripheral edge, calculate a world coordinate point cloud by calculating a global positioning system (GPS) location of the semantic points includes a pose error corrected, establish a probability value for a base-level grid, generate a semantic grid map by identifying a dominant percentage of the probability value of (Continued)

the base-level grid and an upper-level grid, and generate a semantic map from the semantic grid map to represent the region of interest; and; and a communication circuit, coupled to the control circuit, configured to transmit the semantic map for displaying on a device.

20 Claims, 7 Drawing Sheets

(51) Int. Cl.
    *G01C 21/36*     (2006.01)
    *G06T 7/73*     (2017.01)
(52) U.S. Cl.
    CPC ............ *G06T 7/73* (2017.01); *G01C 21/3878* (2020.08); *G06T 2207/10028* (2013.01); *G06T 2207/30252* (2013.01)

(56) References Cited

U.S. PATENT DOCUMENTS

| | | | |
|---|---|---|---|
| 10,488,507 B2 * | 11/2019 | Adachi | ................ G01S 13/931 |
| 11,253,997 B2 * | 2/2022 | Spies | ...................... B25J 9/161 |
| 11,698,272 B2 * | 7/2023 | Kroepfl | ................ C03C 17/366 |
| | | | 701/409 |
| 2024/0004388 A1 * | 1/2024 | Banerjee | .............. G05D 1/0212 |
| 2024/0249430 A1 * | 7/2024 | Zhu | ...................... G01C 21/005 |

FOREIGN PATENT DOCUMENTS

| | | | | |
|---|---|---|---|---|
| CN | 116086431 A | * | 5/2023 | |
| DE | 102019201930 A1 | | 8/2020 | |
| GB | 2610410 B | * | 10/2023 | ........... G06T 19/006 |
| WO | 2020053611 A1 | | 3/2020 | |

* cited by examiner

NAVIGATION SYSTEM WITH SEMANTIC MAP PROBABILITY MECHANISM AND METHOD OF OPERATION THEREOF

TECHNICAL FIELD

An embodiment of the present invention relates generally to a navigation system, and more particularly to a system with a semantic data map generation and distribution system.

BACKGROUND ART

As autonomous vehicles emerge on the scene, they require detailed high definition maps that can display every aspect of a roadway along a route. The generation of such detailed high definition maps can be a daunting task. Further, as changes are made in the area of roadways, those details must be captured in real-time in order to automatically keep the high definition maps up to date. Since different manufacturers use varying quality of the sensors to observe the area surrounding a vehicle, resolving the high definition maps can present compatibility issues.

Thus, a need still remains for a navigation system with a semantic map probability mechanism to provide high definition maps for autonomous, semi-autonomous, or free-drive mode vehicles. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY OF THE INVENTION

An embodiment of the present invention provides a method of operation of a navigation system including: capturing a semantic frame from a sensor data stream for a region of interest; cropping an outer peripheral edge of the semantic frame by removing semantic points beyond the outer peripheral edge; calculating a world coordinate point cloud by calculating a global positioning system (GPS) location of the semantic points includes a pose error corrected; establishing a probability value for a base-level grid; generating a semantic grid map by identifying a dominant percentage of the probability value of the base-level grid and an upper-level grid; generating a semantic map from the semantic grid map to represent the region of interest; transmitting the semantic frame through a network; and transmitting the semantic map through the network for displaying on a device.

An embodiment of the present invention provides a navigation system, including a control circuit configured to: capture a semantic frame from a sensor data stream for a region of interest, crop an outer peripheral edge of the semantic frame by removing semantic points beyond the outer peripheral edge, calculate a world coordinate point cloud by calculating a global positioning system (GPS) location of the semantic points includes a pose error corrected, establish a probability value for a base-level grid, generate a semantic grid map by identifying the dominant percentage of the probability value of the base-level grid and an upper-level grid, and generate a semantic frame from the semantic grid map to represent the region of interest; and a communication circuit, coupled to the control circuit, configured to: transmit the semantic frame through a network, and transmit the semantic map through the network for displaying on a device.

An embodiment of the present invention provides a non-transitory computer readable medium including instructions for a navigation system, including: capturing a semantic frame from a sensor data stream for a region of interest; cropping an outer peripheral edge of the semantic frame by removing semantic points beyond the outer peripheral edge; calculating a world coordinate point cloud by calculating a global positioning system (GPS) location of the semantic points includes a pose error corrected; establishing a probability value for a base-level grid; generating a semantic grid map by identifying a dominant percentage of the probability value of the base-level grid and an upper-level grid; generating a semantic grid map from the semantic grid map to represent the region of interest; transmitting the semantic frame through a network; and transmitting the semantic map through the network for displaying on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION OF THE INVENTION

Figure 1:
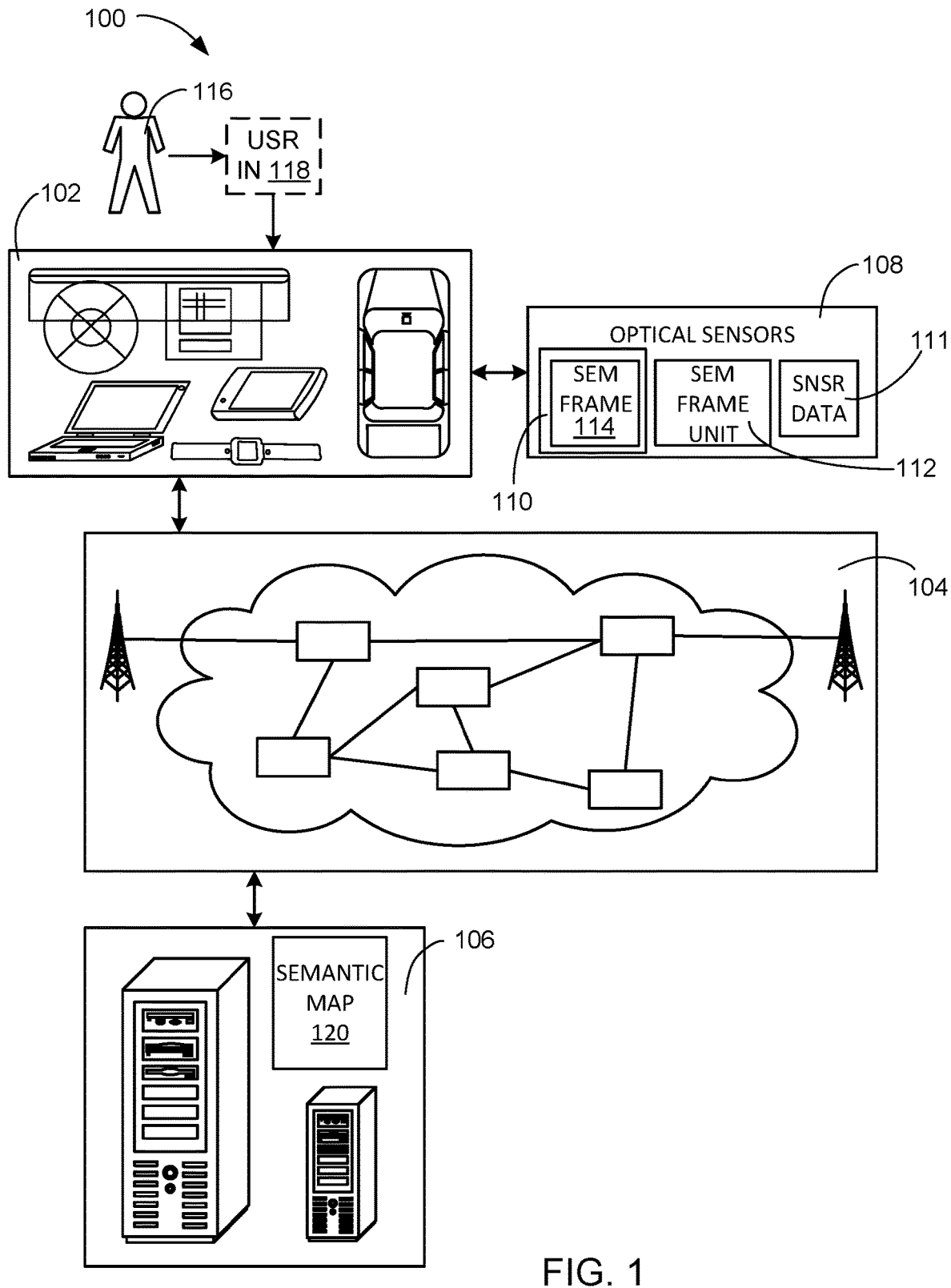
FIG. 1 is a block diagram of a navigation system with a semantic map probability mechanism in an embodiment of the present invention.

The features described, on an individual basis, can be executed in combination without altering the claimed invention. The description of the individual features is for clarity and understanding of the depth and breadth of the claimed invention, without limitation on the combination of those features.

A semantic map is a two-dimensional overview of roadway details in the region surrounding the device that is recording the semantic map. The semantic map can be assembled from the sensors that monitor the region surrounding the device. The semantic map can provide roadway details of a planned route that the device will encounter as it completes the route.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments of various components as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y, Z); where X and Y and Z are three coordinates that define the geographic location, i.e., a position of a vehicle, an artifact, or a pixel in an optical frame.

The term "module" or "unit" referred to herein can include or be implemented as or include software running on specialized hardware, hardware, or a combination thereof in the present invention in accordance with the context in which the term is used. For example, the software can be machine code, firmware, embedded code, and application software. The software can also include a function, a call to a function, a code block, or a combination thereof.

Also, for example, the hardware can be gates, circuitry, processor, computer, integrated circuit, integrated circuit cores, memory devices, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a "unit" is written in the system claims section below, the "unit" is deemed to include hardware circuitry for the purposes and the scope of the system claims.

The units in the following description of the embodiments can be coupled or attached to one another as described or as shown. The coupling or attachment can be direct or indirect without or with intervening items between coupled or attached modules or units. The coupling or attachment can be by physical contact or by communication between modules or units, such as wireless communication.

The term "pose" as used in this specification means the location and orientation of an object in a global coordinate framework. The pose of an object can include longitude, latitude, elevation, yaw, pitch, and roll. The term "yaw" indicates the heading or direction of travel of the object. The term "pitch" indicates the inclination of the object, uphill, downhill, or level. The term "roll" indicates rotation about a front-back axis. The term "pose error" is the difference between two of the pose samples. The term "parse" as used in the specification means to process a database in looking-up a base-level grid of the semantic map.

The term "fuse" or "fusing" as used in the specification and the claims have the meaning of combining, concatenating, merging, or integrating optical data or figures as appropriate for the usage of the term. The term "crop" or "cropping" as used in the specification and claims means to reduce the size of a frame or view by removing details beyond a peripheral edge. By way of an example, the extremities of a fisheye lens can heavily distort the view being captured. In order to facilitate processing of the scene captured by the fisheye lens, the view of the extreme angles can be cropped to remove the outermost portions of the captured scene and reduce the overall distortion processing.

It is also understood that the nouns or elements in the embodiments can be described as a singular instance. It is understood that the usage of singular is not limited to singular but the singular usage can be applicable to multiple instances for any particular noun or element in the application. The numerous instances can be the same or similar or can be different.

Referring now to FIG. 1, therein is shown a block diagram of a navigation system 100 with a semantic data map mechanism in an embodiment of the present invention. The navigation system 100 can include a first device 102, such as a client or a server, connected to a second device 106, such as a client or server.

The navigation system 100 can include a system for photographing information about a road or thoroughfare based on fusion of multiple sources to reconcile and identify specific details about the roadway surface and signage associated with traffic flow on the roadway. The first device 102 can communicate with the second device 106 through a network 104, such as a wireless or wired network.

For example, the first device 102 can be of any of a variety of computing devices, such as a cellular phone, personal digital assistant, a notebook computer, an autonomous vehicle, automotive telematics navigation system, or other multi-functional device. Also, for example, the first device 102 can include a device or a sub-system, an autonomous or self-maneuvering vehicle or object, a driver assisted vehicle, a remote-controlled vehicle or object, or a combination thereof.

The first device 102 can couple, either directly or indirectly, to the network 104 to communicate with the second device 106 or can be a stand-alone device. The first device 102 can further be separate from or incorporated with a vehicle, such as a car, truck, bus, or motorcycle.

For illustrative purposes, the navigation system 100 is described with the first device 102 as a mobile computing device, although it is understood that the first device 102 can be different types of devices.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, a wearable device, or a different type of client device.

Also, for illustrative purposes, the navigation system 100 is described with the second device 106 as a computing device, although it is understood that the second device 106 can be different types of devices. Also, for illustrative purposes, the navigation system 100 is shown with the second device 106 and the first device 102 as endpoints of the network 104, although it is understood that the navigation system 100 can include a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

The navigation system 100 can provide additional features that are not available in prior art navigation systems. The first device 102 can be coupled to or incorporate optical sensors 108 that include a sensor data local storage 110 and a semantic frame unit 112. The optical sensors 108 are monitoring devices, such as a set of monocular cameras positioned on the first device 102, configured to monitor, observe, record, or a combination thereof the surroundings of the first device 102. The sensor data local storage 110 provides a non-transitory storage medium loaded by the semantic frame unit 112 to store a sensor data stream 111 captured by selecting a single optical frame from each of the optical sensors 108 concurrently. The semantic frame unit 112 can be a hardware structure supported by software including four banks of the memory that can be concurrently loaded from the sensor data stream 111 of the optical sensors 108. The semantic frame unit 112 can include circuitry that analyzes and corrects the overlap region from each of the optical sensors 108 to identify items or elements that appear in more than one of the optical sensors 108.

The semantic frame unit 112 can store a semantic frame 114, in the sensor data local storage 110, capable of storing fixed size frames from each of the optical sensors 108, such as periodically captured semantic frame 114 in succession. The semantic frame 114 can be a single optical frame taken from the sensor data stream 111 from each of the optical sensors 108 that has been processed by the semantic frame unit 112. One of the semantic frame 114 can be stored and processed, while the next semantic data frame is loaded into memory. Once processed, the semantic frame 114 can be serially added to the sensor data local storage 110.

For example, the sensor data local storage 110 can be implemented in a number of ways, such as a non-volatile storage device, such as a hard disk drive, a solid state storage device (SSD), a FLASH memory card, or a combination thereof capable of fusing the sensor data stream 111 from each of the optical sensors 108 into the semantic frame 114.

The semantic frame unit 112 can provide a pixel evaluation module, that can be implemented in software running of specialized hardware, full hardware, or a combination thereof configured to analyze a photographic scene to identify semantic data around the first device 102. The semantic data can include road markings, road boundaries, traffic control devices, pedestrians, other vehicles, crosswalks, lane markers, or a combination thereof. The semantic frame unit 112 can combine a sensor data stream 111, including sampled frames of semantic data from each or the optical sensors 108, in order to provide a semantic frame 114.

The semantic frame 114 is a two-dimensional overhead view of a roadway in a region surrounding the first device 102. It is understood that the compilation of the sensor data stream 111 from four of the optical sensors 108 can be displayed as the semantic frame 114 for localization and positioning. The semantic frame unit 112 can provide position correction of semantic elements that are duplicated in more than one of the sensor data stream 111. It will be understood that wide angle lenses of the optical sensor 108 will provide overlap regions that observe the same objects from different angles. The semantic frame unit 112 can correct the pose error caused by these overlap regions during the generation of the semantic frame 114.

The sensor data local storage 110 can be coupled to or integrated with the optical sensors 108 in order to store a sensor data stream 111 from each of the optical sensors 108 available in the first device 102. The first device 102 can receive the semantic frame 114 from the optical sensors 108 to transfer the semantic frame 114, over the network 104, to the second device 106 for processing and analysis. In an embodiment, the semantic frame 114 can include the unprocessed sensor data stream 111. In this embodiment the processing of the data from the semantic frame 114 is performed by the second device 106.

The navigation system 100 can be operated by a user 116. The user 116 can include a person or an entity accessing or utilizing the navigation system 100 or a device therein. For example, the user 116 can include a person owning or operating the first device 102, a service, or a combination thereof. Also, for example, the user 116 can access or utilize the second device 106 through the first device 102, a service, or a combination thereof.

The navigation system 100 can further process a direct user input 118 from the user 116. The direct user input 118 can include the user 116 taking manual control of the autonomous vehicle or the first device 102. The direct user input 118 can be provided by or from the user 116 directly to or directly on the first device 102.

The direct user input 118 can include an increase in speed, a decrease in speed, a change of position within a lane, stop, start, or changing lanes as prompted or controlled by the user 116. The direct user input 118 can include the user 116 issuing audio commands or physically managing the manual controls within the first device 102.

The second device 106 can receive the semantic frame 114 periodically from the first device 102. The second device 106 can process and stitch together several of the semantic frame 114 in order to generate a semantic map 120. The semantic map 120 can contain sufficient detail of the roadways in a region of interest for an autonomous vehicle, such as the first device 102, to maintain autonomous control on a planned route throughout the region of interest.

The second device 106 can refine the quality of the semantic map 120 by performing a probability analysis of the pixels in each of the semantic layers in the semantic frame 114. The second device 106 can process the semantic layers of the semantic frame 114 in order to correct any pose error, stitching error, and noise that can reduce the accuracy of the semantic map 120.

It is understood that while the embodiment described above requires the processing power of the first device 102 and the second device 106, but it is understood that the full operation of the navigation system can be performed within the first device 102. Other partitions of the invention are possible and would be understood by one having ordinary skill in the art.

It has been discovered that the navigation system 100 can reliably generate the semantic map 120 from the periodically delivered ones of the semantic frame 114. By joining the processed layers of the semantic frame 114, a highly accurate and noise free version of the semantic map 120 can be delivered to the first device 102 for display and control of the first device 102.

Figure 2:
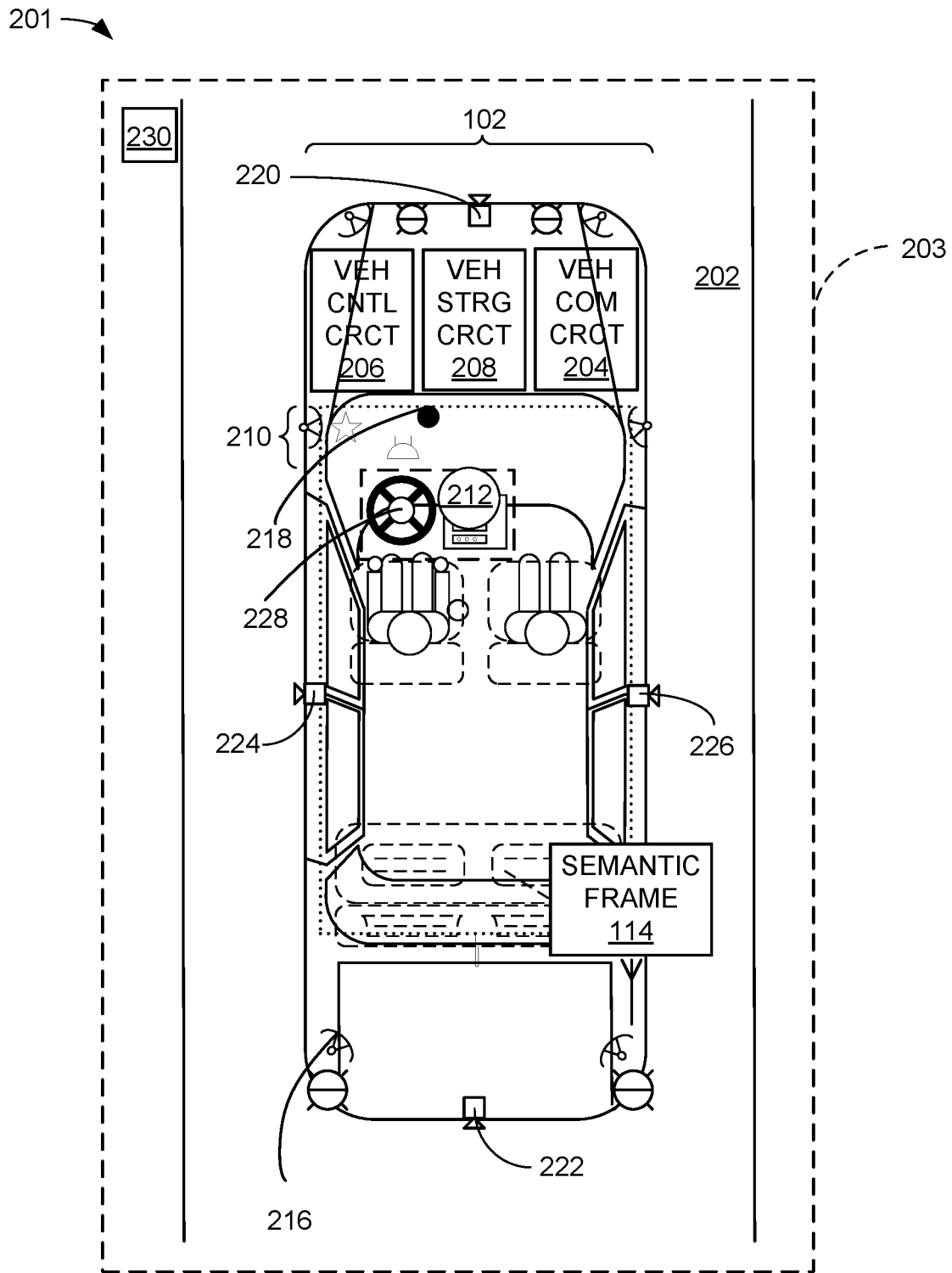
FIG. 2 is an example a top plan view illustration of a vehicle travelling in a region.

Referring now to FIG. 2, therein is shown a top plan view illustration 201 of a vehicle 102 travelling in a region. The top plan view illustration 201 of the vehicle 102 travelling in a region provides that the navigation system 100 of FIG. 1 can include or interact with the first device 102.

The first device 102 can be an object or a machine used for transporting people or goods capable of automatically maneuvering or operating the object or the machine. The first device 102 can include vehicles accessible by the user 116 of FIG. 1 for control, maneuver, operation, or a combination thereof. For example, the first device 102 can include a car, a truck, a cart, a drone, or a combination thereof.

The first device 102 can further be controlled or maneuvered without the direct user input 118 of FIG. 1 corresponding to the maneuver or the movement. For example, the first device 102 can include a self-driving vehicle, or a vehicle with automatic maneuvering features, such as smart cruise control or preventative breaking. The first device 102 can include a smart cruise control feature, capable of setting and adjusting the travel speed of the first device 102 without the direct user input 118. Also for example, the first device 102 can be controlled or maneuvered by the navigation system 100, including the navigation system 100 controlling or setting a cruising speed, lane position, or other physical maneuvers or movements of the first device 102.

The navigation system 100 can further utilize the semantic frame 114 from one or more vehicles or devices. The semantic map 120 of FIG. 1 can provide high definition information describing a roadway 202 in a region of interest 203. The region of interest 203 can be the geographical area surrounding the first device 102 during the capture of the semantic frame 114. In some instances, the region of interest 203 can be a geographic location the first device 102 can be guided to in order to capture the semantic frame 114.

The first device 102 or other vehicles interfacing with the navigation system 100 can include a device, a circuit, one or more specific sensors, such as environmental sensors 210, or a combination thereof for providing assistance or additional information to the user 116 controlling, maneuvering, or operating the first device 102. The environmental sensors 210) can include a cabin camera, LiDAR sensors, the optical sensors 108, or a combination thereof. The optical sensors 108 can be camera with a wide-angle lens, such as a fisheye lens. The optical sensors 108 can be mounted on the exterior of the first device 102 positioned at the front, rear, right side, and left side of the first device 102. The first device 102 or any other vehicles can include a vehicle communication circuit 204, a vehicle control circuit 206, a vehicle storage circuit 208, other interfaces, or a combination thereof.

The vehicle storage circuit 208 can include a functional unit or circuit integral to the corresponding first device 102 and configured to store and recall information. The vehicle storage circuit 208 can be a volatile memory, a nonvolatile memory, an internal memory, an external memory, or a combination thereof. For example, the vehicle storage circuit 208 can be a nonvolatile storage such as non-volatile random access memory (NVRAM), Flash memory, disk storage, or a volatile storage such as static random access memory (SRAM).

The vehicle storage circuit 208 can store vehicle software, other relevant data, such as input information, information from sensors, processing results, information predetermined or preloaded by the navigation system 100 or vehicle manufacturer, or a combination thereof. The vehicle storage circuit 208 can periodically load the semantic frame 114 from the optical sensors 108.

The vehicle control circuit 206 can include a function unit or circuit integral to the first device 102 and configured as a processor to execute or implement instructions. The vehicle control circuit 206 can execute or implement the vehicle software to provide the intelligence of the corresponding vehicle, the navigation system 100, or a combination thereof.

The vehicle control circuit 206 can be implemented in a number of different manners. For example, the vehicle control circuit 206 can be a processor, an application specific integrated circuit (ASIC) an embedded processor, a microprocessor, a hardware control logic, a hardware finite state machine (FSM), a digital signal processor (DSP), or a combination thereof. As a more specific example, the vehicle control circuit 206 can include an engine control unit, one or more central processing unit, or a combination thereof The vehicle communication circuit 204 can include a function unit or circuit integral to the corresponding vehicle, such as the first device 102, another vehicle, or a combination thereof. The vehicle communication circuit 204 can be configured to enable external communication to and from the corresponding vehicle. For example, the vehicle communication circuit 204 can permit the first device 102 to communicate with the second device 106 of FIG. 1 through the network 104 of FIG. 1 including identifying the geolocation of the first device 102 through triangulation.

The vehicle communication circuit 204 can also function as a communication hub allowing the corresponding control vehicle to function as part of the network 104 and not limited to be an end point or terminal circuit to the network 104. The vehicle communication circuit 204 can include active and passive components, such as microelectronics, circuitry, or an antenna, for interaction with the network 104. For example, the vehicle communication circuit 204 can include a modem, a transmitter, a receiver, a port, a connector, or a combination thereof for wired communication, wireless communication, or a combination thereof.

The vehicle communication circuit 204 can couple with the network 104 to send or receive information directly between the vehicle communication circuit 204 and the second device 106 as end points of the communication, such as for direct line-of-sight communication or peer-to-peer communication. The vehicle communication circuit 204 can further couple with the network 104 to send or receive information through a server or another intermediate device in between endpoints of the communication.

The first device 102 or other vehicles can further include various interfaces. The first device 102 can include one or more interfaces for interaction or internal communication between functional units or circuits of the first device 102. For example, the first device 102 can include one or more interfaces, such as drivers, firmware, wire connections or buses, protocols, or a combination thereof, for the vehicle storage circuit 208, the vehicle control circuit 206, or a combination thereof.

The first device 102 or the other vehicles can further include one or more interfaces for interaction with an occupant, an operator or a driver, a passenger, or a combination thereof relative to the corresponding vehicle. For example, the first device 102 or the other vehicles can include a user interface 212 including input or output devices or circuits, such as a screen or touch screen, a speaker, a microphone, a keyboard or other input devices, an instrument panel, or a combination thereof.

The first device 102 can further include one or more interfaces along with switches or actuators for physically controlling movable components of the first device 102. For example, the first device 102 can include the one or more interfaces along with the controlling mechanisms to physically perform and control the maneuvering of the first device 102, such as for automatic driving, smart cruise control, or maneuvering features.

The functional units or circuits in the first device 102 can work individually and independently of the other functional units or circuits. The first device 102 can work individually and independently from the network 104, the second device 106, other devices or vehicles, or a combination thereof.

The functional units or circuits described above can be implemented in hardware. For example, one or more of the functional units or circuits can be implemented using a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

The environmental sensors 210 are each a device or a circuit for detecting or identifying environment of the corresponding vehicle. The environmental sensors 210 can detect, identify, determine, or a combination thereof, such as for status, surroundings or movement for the corresponding vehicle. The environmental sensors 210 can detect, identify, determine, or a combination thereof for environment within a cabin of the corresponding vehicle, an environment external to and surrounding the corresponding vehicle, or a combination thereof. The environmental sensors 210 can be implement for the first device 102.

For example, the environmental sensors 210 can include a user interface 212, the optical sensor 108, a radar sensor 216, a location-movement sensor 218, or a combination thereof. The user interface 212 can include a projector, a video screen, a touch screen, a speaker, or any combination thereof. The user interface 212 can display the semantic map 120 of FIG. 1, a planned route, lane suggestions, speed warnings, vehicle system alerts and combinations thereof.

The optical sensor 108 can include a sensor for detecting or determining visual information representing the environment external to and surrounding of the corresponding vehicle. The optical sensor 108 can include a camera attached to or integral with the corresponding vehicle or device. For example, the optical sensor 108 can include a camera, such as forward facing camera, a video camera, a rear-view or back-up camera, a side-view or a blind-spot camera, or a combination thereof. Also, for example, the optical sensor 108 can include an infrared sensor, a night vision video camera, or a night vision sensor.

The optical sensor 108 can further include a camera on the first device 102 or another user device of the user 116 connected to and interacting with a vehicle. The optical sensor 108 can further include a cabin camera for detecting or determining visual information inside the vehicle or cabin of the vehicle.

The radar sensor 216 can include an object-detection system, device, or circuit. The radar sensor 216 can determine or identify an existence of an object or a target, such as an obstacle or another vehicle, external to the corresponding device or vehicle, a relative location or a distance between the object or the target and the corresponding device or vehicle, or a combination thereof.

The radar sensor 216 can utilize high frequency waves to determine or identify an existence of the object or the target, the relative location or a distance relative to the first device 102 or other corresponding device or vehicle, or a combination thereof. For example, the radar sensor 216 can include a proximity sensor or warning system, such as for an area in front of, behind, adjacent to or on a side of, or a combination thereof geographically or physically relative to the first device 102.

The location-movement sensor 218 can be a sensor for identifying or calculating a geographic location and pose of the corresponding vehicle or device, determining a movement or speed of the corresponding vehicle or device, or a combination thereof. The location-movement sensor 218 can include an accelerometer, a speedometer, a Global Positioning System (GPS) receiver or device, a gyroscope or a compass, or a combination thereof for determining the latitude, longitude, elevation, yaw, pitch, and roll of the first device 102. The first device 102 can include the environmental sensors 210 other than or in addition to the location-movement sensor 218. The location-movement sensor 218 can provide a gyroscope rate of change for monitoring turns and a speed from the speedometer.

The navigation system 100 can use one or more of the optical sensors 108 corresponding to one or more devices, one or more vehicles, or a combination thereof to generate the traffic flow state 109 describing or representing information regarding the environment surrounding the corresponding device or vehicle. The traffic flow state 109 can be further processed with the vehicle control circuit 206, stored in the vehicle storage circuit 208, communicated to another device or vehicle through the vehicle communication circuit 204, or a combination thereof.

As a more specific example, the vehicle communication circuit 204, the vehicle control circuit 206, the vehicle storage circuit 208, the optical sensors 108, one or more interfaces, or a combination thereof can be included in or make up the first device 102.

The navigation system 100 can utilize the semantic frame 114 from devices, vehicles, or a combination thereof to dynamically determine and map road conditions in the region of interest 203 along with vehicles, pedestrians, objects, or a combination thereof within region of interest 203. The navigation system 100 can further utilize the semantic frame 114 to provide information to other vehicles near or planning to enter the region of the first device 102. As a more specific example, the navigation system 100 can use the semantic frame 114 to dynamically locate and map vehicles on the road and provide look-ahead roadway information. The navigation system 100 can further utilize the semantic frame 114 to control movement of the first device 102 at a sub-lane level of granularity.

The navigation system 100 can provide the vehicle movement control 228 as a suggestion to the user 116 for maneuvering or operating the first device 102. Details regarding the utilization and processing of the semantic frame 114 are discussed below.

The navigation system 100 can process and generate vehicle movement control 228 for controlling or maneuvering the first device 102. The vehicle movement control 228 is an instruction, a signal, a process, a method, a mechanism, or a combination thereof directing or controlling physical movement or travel of the first device 102.

The navigation system 100 can communicate the semantic frame 114 from the first device 102 to the second device 106 on fixed intervals, such as ten second intervals. For an illustrative example, the navigation system 100 supports the second device 106 conveying the semantic map 120 to the first device 102 and to other vehicles near or planning to enter the region reported by the first device 102.

Continuing with the example, the navigation system 100 can use the semantic frame 114 generated or provided from the first device 102 without the user input 114. The navigation system 100 can utilize the semantic frame 114 to provide information, assist maneuvering, control maneuvers, or a combination thereof for other vehicles near the first device 102.

Continuing with the example, the navigation system 100 can communicate the semantic map 120 through the second device 106 to other devices or vehicles, or directly communicate to the other devices or vehicles, such as for a peer-to-peer communication system. The navigation system 100 can communicate the semantic map 120 for informing other devices or vehicles of the location or status of the first device 102 itself, about other vehicles detected and identified around the first device 102, or a combination thereof.

As a more specific example, the navigation system 100 can use the semantic map 120 to generate the vehicle movement control 228, such as for steering, braking, setting or adjusting travel speed, accessary control, or a combination thereof. Details regarding the processing of the vehicle movement control 228 are discussed below.

It is understood that the optical sensors 108 can be positioned at fixed locations around the first device 102. By way of an example, a front optical sensor 220, a rear optical sensor 222, a left side optical sensor 224, and a right optical sensor 226 can monitor the region of interest 203 including the details of the roadway 202. The combination of the optical data streams 111 of FIG. 1 from each of the front optical sensor 220, the rear optical sensor 222, the left side optical sensor 224, and the right optical sensor 226 can be fused by the semantic frame unit 112 of FIG. 1 to form the semantic frame 114. It is understood that due to the characteristics of the wide-angle lenses of the optical sensors 108, objects can appear in more than one of the optical data streams 111. By way of an example, a traffic control sign 230 can be observed by the front optical sensor 220 and the left side optical sensor 224 at the same time. The semantic frame unit 112 can resolve the two streams to identify the location of the traffic control sign 230 as a single element.

Figure 3:
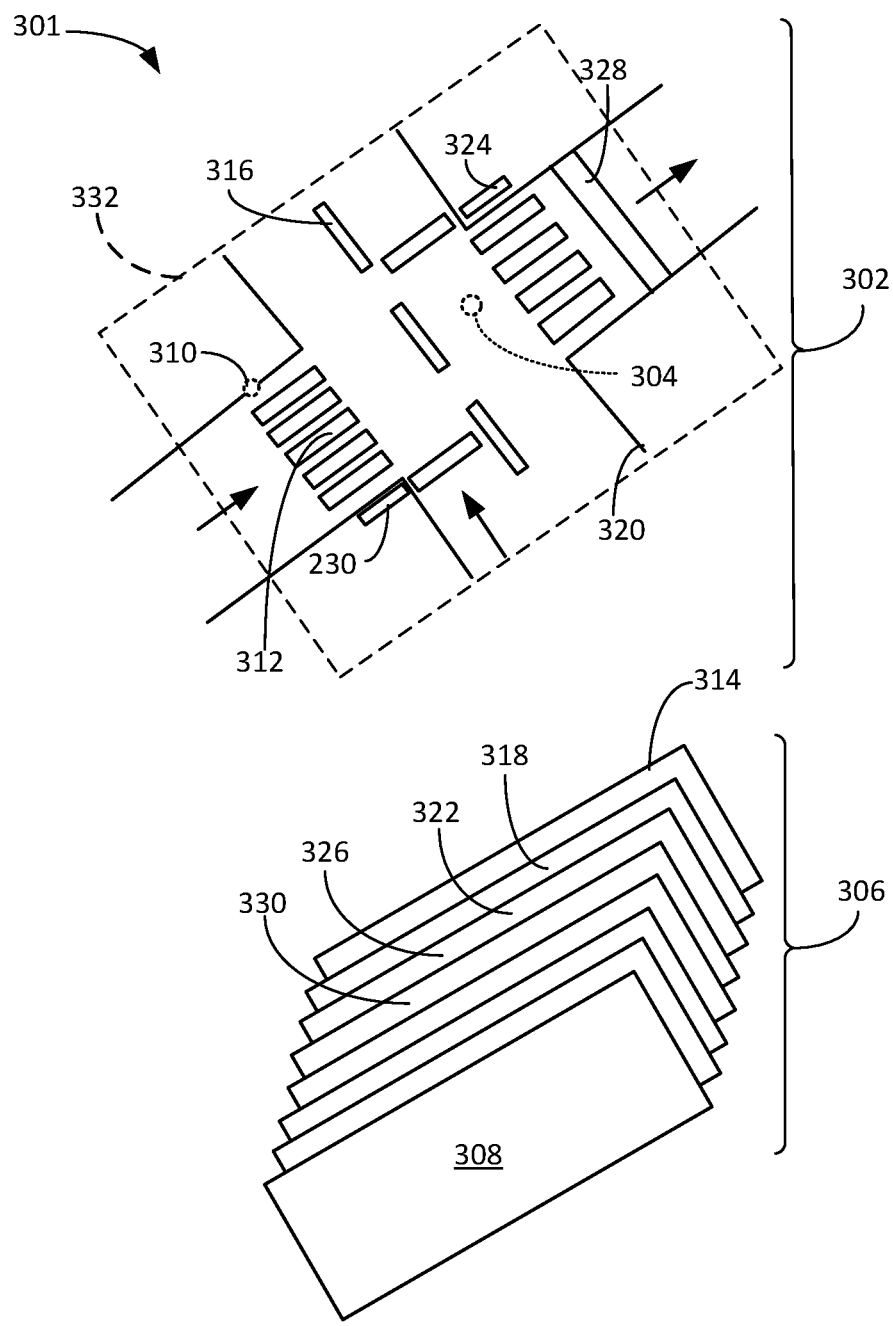
FIG. 3 is an exemplary overhead view of a region of interest as processed by the navigation system.

Referring now to FIG. 3, therein is shown an exemplary overhead view 301 of a region of interest 203 as processed by the navigation system 100. The region of interest 203 can include a point data cloud 302, as observed in the semantic frame 114 of FIG. 1 surrounding the first device 102 of FIG. 1, such as an intersection. A frame center 304 can represent the location of the first device 102 when the semantic frame 114 was captured. The frame center 304 can be the geolocation of the first device 102 when the semantic frame 114 was captured and is the center of the semantic frame 114.

The semantic frame unit 112 of FIG. 1 can capture the optical data streams 111 of FIG. 1 from each of the front optical sensor 220 of FIG. 2, the rear optical sensor 222 of FIG. 2, the left side optical sensor 224 of FIG. 2, and the right optical sensor 226 of FIG. 2 in order to process the point data cloud 302. The semantic frame unit 112 can identify common elements detected by the front optical sensor 220, the rear optical sensor 222, the left side optical sensor 224, the right optical sensor 226, or a combination thereof as the same element or artifact. The point data cloud 302 represents semantic layers 306 including all pixels aligned in orientation with and having coordinates relative to the first device 102.

The semantic frame unit 112 can identify specific elements to segregate them into semantic layers 306. Each of the semantic layers 306 can contain a single element type, including road markings, road boundaries, traffic control devices, pedestrians, other vehicles, crosswalks, lane markers, bumps or defects, or a combination thereof. Elements that do not fit into the defined categories can be assigned to an unknown layer 308. Each of the semantic layers 306 can be processed individually. The union of the semantic layers 306 can be displayed as the overhead view 301.

By way of an example, the semantic frame unit 112 can receive and convert the optical data streams 111 into the point data cloud 302 by establishing the coordinates of the relative to the frame center 304. The semantic frame unit 112 can process each of the semantic layers 306 individually. The point data cloud 302 can be down-sampled to remove redundant data from the large pixel data of the optical data streams 111. The cropping process can remove approximately 10 percent of the outer border of the overhead view 301. Any of the pixels in the outer 10 percent of the overhead view 301 can be discarded and will not be processed. The cropping process can act as a filter to remove noise caused by the distortion at the extremities of the view of the optical sensors 108 of FIG. 1. It is understood that the fisheye lens of the optical sensors 108 can be characterized to define the allowable distortion at the extremities of the overhead view 301.

The semantic frame unit 112 can assign a body coordinate, relative to the position of the first device 102, to each semantic point 310 based on the direction relative to the frame center 304 and the distance from the frame center 304. The semantic point 310 represents a single pixel captured by the optical sensors 108 of a type specified by semantic layers 306. It is understood that the frame center 304 represents the location of the first device 102 in the overhead view 301. Each of the semantic layers 306 captures only a single type including road markings, road boundaries, traffic control devices, pedestrians, other vehicles, crosswalks, lane markers, or bumps or defects.

The semantic frame unit 112 can capture the real world location, such as a GPS location, of the first device 102 when the optical data stream 111 is recorded. The semantic frame unit 112 can calculate the real world coordinates of the semantic points 310 in each of the semantic layers 306 forming the overhead view 301.

The characteristic of the wide-angle lens of the optical sensors 108 provides greater distortion at greater angles from the perpendicular to the lens of the optical sensors 108. The semantic frame unit 112 can learn the extent to which any semantic point 310 can be relied upon, and which of the semantic point must be adjusted or moved to the unknown layer 308. The semantic frame unit 112 can convert the relative location of the semantic point 310 to the global coordinate system based on the GPS location of the frame center 304 and a pixel count to the semantic point 310.

When each of the semantic layers 306 have been processed, the semantic frame 114, including all of the semantic layers 306, can be transferred to the second device 106 of FIG. 1 for further processing and generation of the semantic map 120 of FIG. 1. The first device 102 can transfer the semantic frame 114 through the network 104 of FIG. 1 to the second device 106.

It has been discovered that artifacts detected as a crosswalk 312 can be processed in a crosswalk layer 314. Road markings 316, including lane lines, intersection limit lines, and direction arrows, can be processed in a road marking layer 318. Road boundaries 320 including curbs, boundary lines, sidewalks, medians, parking boundaries, or a combination thereof, can be processed in a road boundaries layer 322. Traffic control devices 324, including the traffic control sign 230, traffic lights, stop signs, yield signs, pedestrian control signs, or a combination thereof, can be processed in a traffic control layer 326. A bump or defect 328, such as a speed bump, damaged pavement, pot holes, or the like can be processed in a bump layer 330. Other ones of the semantic layers 306 can be assigned as necessary.

The combination of the semantic layers 306 can form the semantic frame 114. It is understood that the overhead view 301 can represent the semantic frame 114 taken of the intersection already described. Other ones of the overhead view 301 can represent other areas in the region of interest 203 of FIG. 2 travelled by the first device 102. An outer peripheral edge 332 can represent a border to the semantic frame 114 beyond which the maximum distortion, caused by the fisheye lenses, can be found. The outer peripheral edge 332 can be further processed by the navigation system 100. By way of an example, the extremities of a fisheye lens can heavily distort the view being captured. In order to facilitate processing of the scene captured by the fisheye lens, the view of the extreme angles can be cropped to remove the outermost portions of the captured scene and reduce the overall distortion processing.

Figure 4:
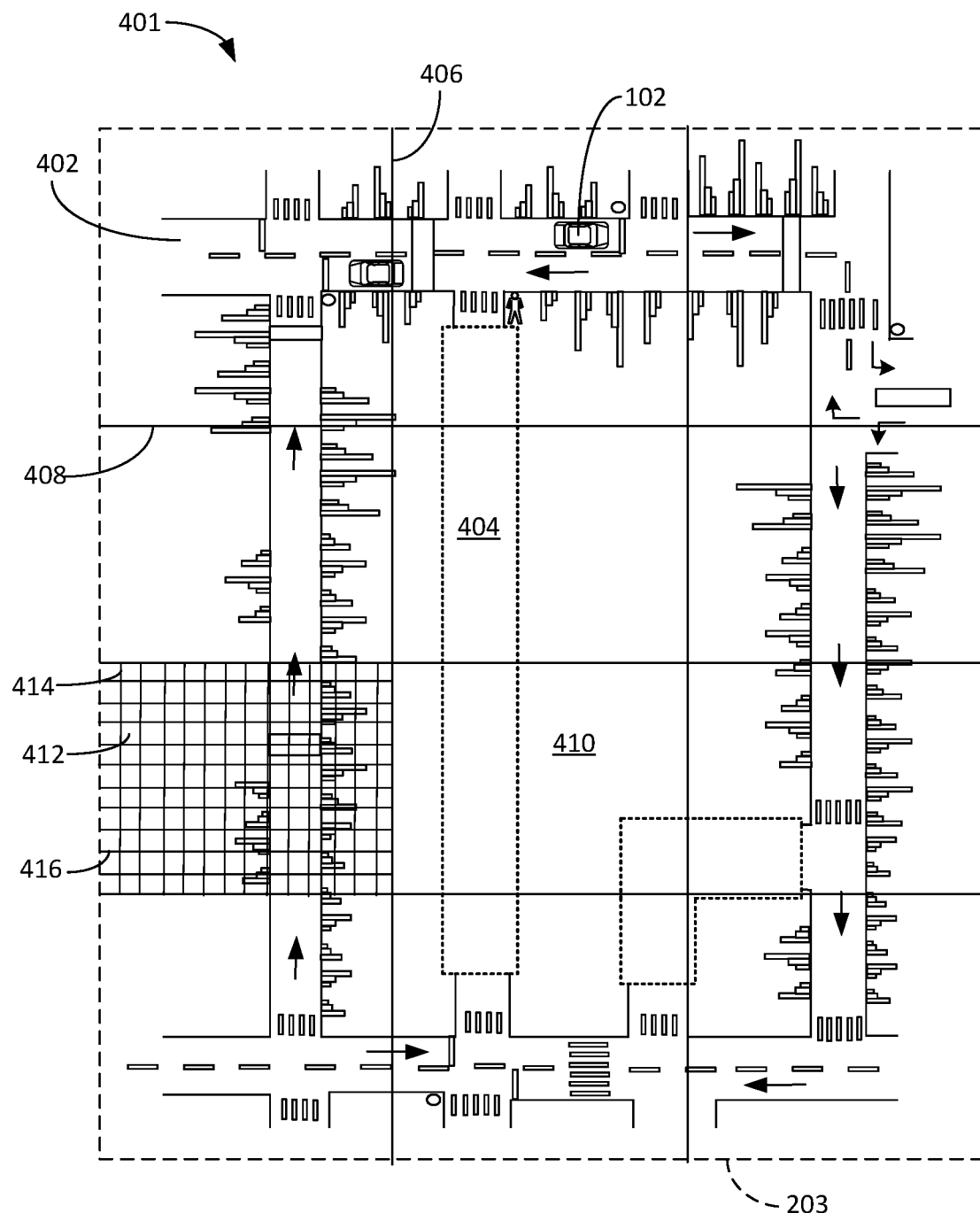
FIG. 4 is an exemplary semantic grid map of the navigation system.

Referring now to FIG. 4, therein is shown an exemplary semantic grid map 401 of the navigation system 100 of FIG. 1. The exemplary semantic grid map 401 depicts the region of interest 203 in a mapping process. The first device 102 can be under manual control by the user 116 of FIG. 1 to traverse a roadway 402 in the region of interest 203 in order to provide the semantic frames 114 to the second device 106 of FIG. 1. The second device 106 can fuse the individual sections represented by the semantic frame 114 into a grid map format. Since the global locations of the semantic points 310 of FIG. 3 is known, the second device 106 can assemble the semantic map 401 and direct the first device 102 to areas that have not yet been processed, such as the unmapped roadway 404.

As the second device 106 receives the semantic frames 114 from the first device, the semantic grid map 401 structure can be formed by vertical grid lines 406 and horizontal grid lines 408. The vertical grid lines 406 and horizontal grid lines 408 can form an upper-level grid 410 having dimensions of H×H meters, where H is an integer greater than one. Within each of the upper-level grid 410 is a base-level grid 412 including vertical lines 414 and horizontal grid lines 416. The base-level grid 412 having dimensions of L×L centimeters, where L is an integer greater than one. It is understood that the base-level grid 412 of L×L centimeters is fit within each cell of the upper-level grid 410 having dimensions of H×H meters.

The two level grid structure of the semantic grid map 401 can reduce memory utilization and accelerate search speeds. Once the first device 102 completes the mapping process of the region of interest 203, the second device 106 can process each of the semantic layers 306 of FIG. 3 individually.

The second device 106 can count the number of the semantic point 310 of FIG. 3 within the base-level grid 412 and the upper-level grid 410. By counting each of the semantic point 310 in the base-level grid 412 and the upper-level grid 410, the second device 106 can characterize the content of the upper-level grid 410.

It is understood that the generation of the semantic frame 114 and the semantic grid map 401 includes noise, such as questionable areas within the base-level grid 412 that could be parts of multiple of the semantic layers 306. In order to reduce the noise and improve the clarity of the semantic grid map 401, a probability analysis can be performed by determining the occupancy of the base-level grid 412 in each of the semantic layers 306. The percentage of occupancy for each of the semantic layers 306, from the base-level grid 412, can be rolled-up into the upper-level grid 410. Each of the base-level grid 412 can be evaluated for occupancy or non-occupancy for each of the semantic layers 306. A probability initialization value can be assigned to the elements on each of the semantic layers 306.

It has been discovered that the navigation system 100 can improve the quality and detail of information captured in the semantic grid map 401. By updating the probability of each of the semantic layers 306 in the upper-level grid 410. By way of an example, each cell of the base-level grid 412 can contain multiple semantic layers. The content of the cell can be attributed to the semantic layer that shows the dominant percentage of the cell. If a cell in the base-level grid 412 contains 5% of the crosswalk layer 314 of FIG. 3 and 95% of the road boundaries layer 322 of FIG. 3, the cell of the base-level grid 412 would be labeled as a road boundary layer 322 cell for the upper-level grid 410. It is understood that any one of the semantic layers 306 that represents a greater percentage of occupancy in the base-level grid 412 represents the dominant percentage of the cell within the base-level grid 412.

Figure 5:
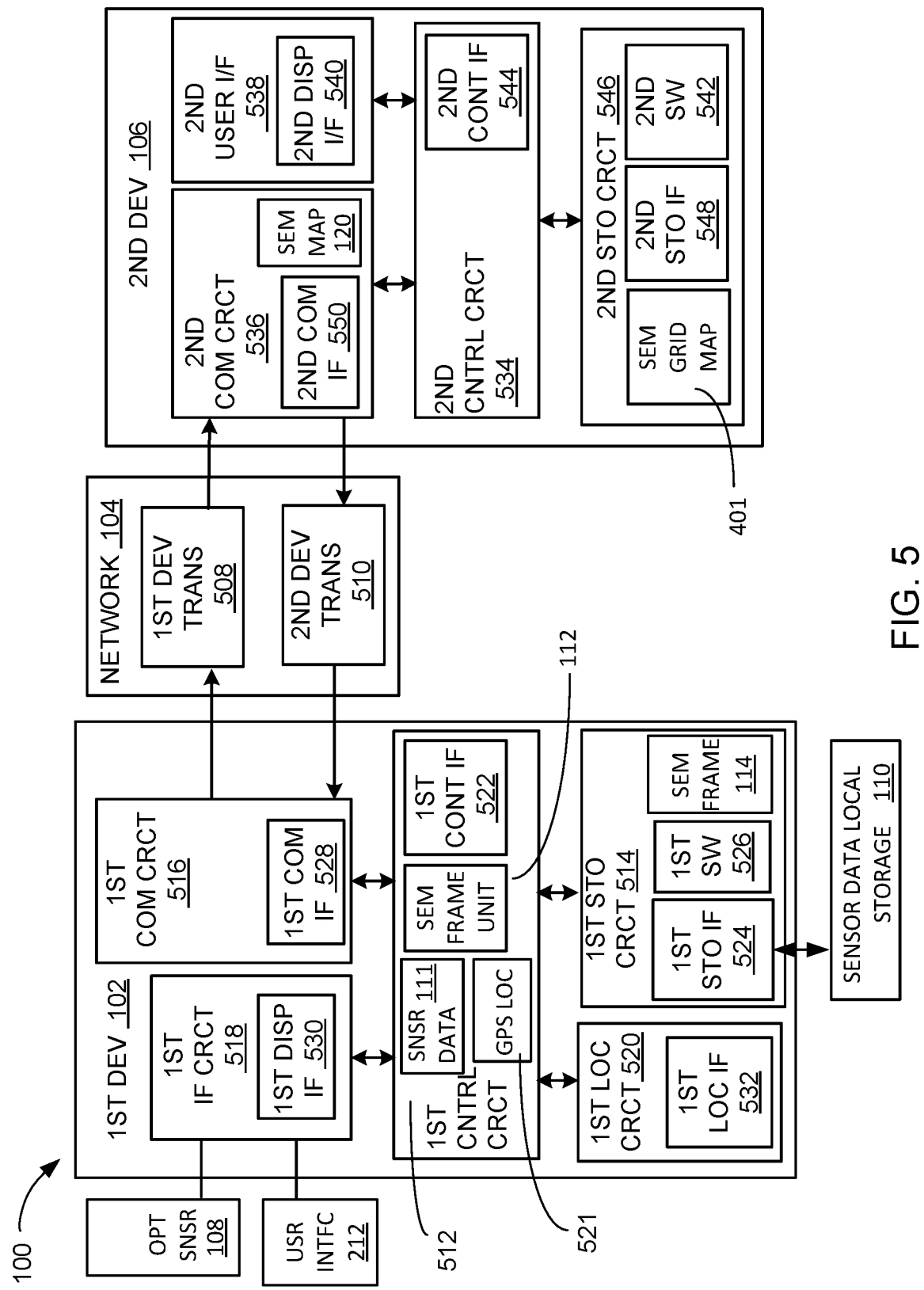
FIG. 5 is an exemplary block diagram of the navigation system in an embodiment.

Referring now to FIG. 5, therein is shown an exemplary block diagram of the navigation system 100 in an embodiment. The navigation system 100 can include the first device 102, the network 104, and the second device 106. The first device 102 can send information in a first device transmission 508 over the network 104 to the second device 106. The second device 106 can send information in a second device transmission 510 over the network 104 to the first device 102.

For illustrative purposes, the navigation system 100 is shown with the first device 102 as a client device, although it is understood that the navigation system 100 can include the first device 102 as a different type of device. For example, the first device 102 can be a server containing the first display interface 530 coupled to the user interface 212.

Also, for illustrative purposes, the navigation system 100 is shown with the second device 106 as a server, although it is understood that the navigation system 100 can include the second device 106 as a different type of device. For example, the second device 106 can be a client device. By way of an example, the navigation system 100 can be implemented entirely on the first device 102. The second device 106 can provide additional computing speed and power. Based on the example provided the first device 102 can act as a data collection and pre-processing device, while the second device can fuse the information collected by the first device 102 into the semantic grid map 401 of FIG. 4 for distribution.

Also, for illustrative purposes, the navigation system 100 is shown with interaction between the first device 102 and the second device 106. However, it is understood that the first device 102 can be a part of or the entirety of an autonomous vehicle, a smart vehicle, or a combination thereof. Similarly, the second device 106 can similarly interact with the first device 102 representing the autonomous vehicle, the intelligent vehicle, or a combination thereof.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 512, a first storage circuit 514, a first communication circuit 516, a first interface circuit 518, and a first location circuit 520. The first control circuit 512 can include a first control interface 522. The first control circuit 512 can execute a first software 526 to provide the intelligence of the navigation system 100.

The first control circuit 512 can be implemented in a number of different manners. For example, the first control circuit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control circuit 512 and other functional units or circuits in the first device 102. The first control interface 522 can also be used for communication that is external to the first device 102.

The first control interface 522 can receive information from the other functional units/circuits or from external sources, or can transmit information to the other functional units/circuits or to external destinations. The external sources and the external destinations refer to sources and destinations external to the first device 102.

The first control interface 522 can be implemented in different ways and can include different implementations depending on which functional units/circuits or external units/circuits are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, analogue circuitry, digital circuitry, or a combination thereof.

The first storage circuit 514 can store the first software 526. The first storage circuit 514 can also store the relevant information, such as data representing incoming images, data representing previously presented image, sound files, or a combination thereof. The first storage circuit 514 can store the semantic frame 114 that is assembled by the semantic frame unit 112 operated by the first control circuit 512.

The first storage circuit 514 can be a volatile memory, a nonvolatile memory, an internal memory, an external memory, or a combination thereof. For example, the first storage circuit 514 can be a nonvolatile storage such as non-volatile random-access memory (NVRAM), Flash memory, disk storage, or a volatile storage such as static random-access memory (SRAM).

The first storage circuit 514 can include a first storage interface 524. The first storage interface 524 can be used for communication between the first storage circuit 514 and other functional units or circuits in the first device 102, such as the sensor data local storage 110 of FIG. 1. The first storage interface 524 can also be used for communication that is external to the first device 102.

The first storage interface 524 can be a hardware circuitry configured to receive information from the other functional units/circuits or from external sources, or can transmit information to the other functional units/circuits or to external destinations. The external sources and the external destinations refer to sources and destinations external to the first device 102. The first storage interface 524 can receive input from and source data to the semantic frame unit 112.

The first storage interface 524 can include different implementations depending on which functional units/circuits or external units/circuits are being interfaced with the first storage circuit 514. The first storage interface 524 can be implemented with technologies and techniques similar to the implementation of the first control interface 522, such as analogue circuitry, digital circuitry, wireless circuitry, or wireline circuitry.

The first communication circuit 516 can enable external communication to and from the first device 102. For example, the first communication circuit 516 can permit the first device 102 to communicate with the second device 106 and the network 104.

The first communication circuit 516 can also function as a communication hub allowing the first device 102 to function as part of the network 104 and not limited to be an endpoint or terminal circuit to the network 104. The first communication circuit 516 can include active and passive components, such as microelectronics, analogue circuitry, wireless circuitry, wireline circuitry, or an antenna, for interaction with the network 104.

The first communication circuit 516 can include a first communication interface 528. The first communication interface 528 can be used for communication between the first communication circuit 516 and other functional units or circuits in the first device 102. The first communication interface 528 can receive information from the second device 106 for distribution to the other functional units/circuits or can transmit information to the other functional units or circuits.

The first communication interface 528 can include different implementations depending on which functional units or circuits are being interfaced with the first communication circuit 516. The first communication interface 528 can be implemented with technologies and techniques similar to the implementation of the first control interface 522, including a microelectromechanical system (MEMS), optical circuitry, waveguides, wireless circuitry, wireline circuitry, analogue circuitry, digital circuitry, or a combination thereof.

The first interface circuit 518 allows the user 116 of FIG. 1 to interface and interact with the first device 102. The first interface circuit 518 can include an input device and an output device. Examples of the input device of the first interface circuit 518 can include a keypad, a touchpad, soft-keys, a keyboard, a microphone, an infrared sensor for receiving remote signals, the optical sensor 108, or any combination thereof to provide data and communication inputs. By way of an example, the optical sensor 108 can connect to the first interface circuit 518 through a wired or wireless connection. The first interface circuit 518 can pass the input from the optical sensor 108 to the first control circuit 512 for processing and storage. The first control circuit 512 can operate the semantic frame unit 112 in order to generate the information required for the semantic frame 114, including the frame center 304, the semantic layers 306 of FIG. 3, and the correction of pose errors.

The first interface circuit 518 can include a first display interface 530. The first display interface 530 can include an output device. The first display interface 530 can couple the user interface 212 including a projector, a video screen, a touch screen, a speaker, a microphone, a keyboard, and combinations thereof.

The first control circuit 512 can operate the first interface circuit 518 to display the semantic grid map 401 of FIG. 4 generated by the navigation system 100 and receive input from the user 116 of FIG. 1. The first control circuit 512 can also execute the first software 526 for the other functions of the navigation system 100, including receiving a global positioning system (GPS) location 521 from the first location circuit 520. The first control circuit 512 can further execute the first software 526 for interaction with the network 104 via the first communication circuit 516.

The first control circuit 512 can operate the first interface circuit 518 to collect data from the optical sensors 108. The first control circuit 512 can also receive location information from the first location circuit 520. The first control circuit 512 can operate semantic frame unit 112 of FIG. 1 in order to deliver the semantic frame 114 to the second device 106 for further processing. The first control circuit 512 can operate the first communication circuit 516 to transmit the semantic frame 114 and receive the semantic grid map 401.

The first location circuit 520 can be a hardware circuit configured to generate location information used to identify the frame center 304 of FIG. 3 in real world coordinates, such as the GPS location 521. The first location circuit 520 can be implemented in many ways. For example, the first location circuit 520 can function as at least a part of the global positioning system, an inertial navigation system, a cellular-tower location system, a gyroscope, or any combination thereof. Also, for example, the first location circuit 520 can utilize components such as an accelerometer, gyroscope, or global positioning system (GPS) receiver in order to identify the current location on the Earth by satellite triangulation of cell tower triangulation, including calculating pseudo ranges to the satellites or the cell towers.

The first location circuit 520 can include a first location interface 532. The first location interface 532 can be used for communication between the first location circuit 520) and other functional units or circuits in the first device 102, including the optical sensor 108.

The first location interface 532 can receive information from the other functional units/circuits or from external sources, or can transmit information to the other functional units/circuits or to external destinations. The external sources and the external destinations refer to sources and destinations external to the first device 102, including satellites and cell towers.

The first location interface 532 can include different implementations depending on which functional units/circuits or external units/circuits are being interfaced with the first location circuit 520. The first location interface 532 can be implemented with technologies and techniques similar to the implementation of the first control circuit 512, including analogue circuitry, digital circuitry, wireless circuitry, or wireline circuitry.

The second device 106 can be optimized for implementing an embodiment of the present invention in a multiple device embodiment with the first device 102. The second device 106 can provide the additional or higher performance processing power compared to the first device 102. The second device 106 can include a second control circuit 534, a second communication circuit 536, a second user interface 538, and a second storage circuit 546.

The second user interface 538 allows an operator (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540) can include a display, a projector, a video screen, a speaker, or any combination thereof.

The second control circuit 534 can receive the semantic frame 114 through the second communication circuit 536. The second control circuit 536 can fuse the content of the semantic frame 114 into the semantic grid map 120 compiled from several of the semantic frame 114 transmitted by the first device 102.

The second control circuit 534 can execute a second software 542 to provide the intelligence of the second device 106 of the navigation system 100. The second software 542 can operate in conjunction with the first software 526. The second control circuit 534 can provide additional performance compared to the first control circuit 512.

The second control circuit 534 can operate the second user interface 538 to display information. The second control circuit 534 can also execute the second software 542 for the other functions of the navigation system 100, including operating the second communication circuit 536 to communicate with the first device 102 over the network 104.

The second control circuit 534 can be implemented in a number of different manners. For example, the second control circuit 534 can be a processor, an embedded processor, a microprocessor, hardware control logic, a hardware finite state machine (FSM), a digital signal processor (DSP), or a combination thereof.

The second control circuit 534 can include a second control interface 544. The second control interface 544 can be used for communication between the second control circuit 534 and other functional units or circuits in the second device 106. The second control interface 544 can also be used for communication that is external to the second device 106.

The second control interface 544 can receive information from the other functional units/circuits or from external sources, or can transmit information to the other functional units/circuits or to external destinations. The external sources and the external destinations refer to sources and destinations external to the second device 106.

The second control interface 544 can be implemented in different ways and can include different implementations depending on which functional units/circuits or external units/circuits are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, analogue circuitry, or a combination thereof.

The second storage circuit 546 can store the second software 542. The second storage circuit 546 can also store the information such as the semantic frame 114 transferred from the first device 102. The second storage circuit 546 can be sized to provide the additional storage capacity to supplement the first storage circuit 514.

For illustrative purposes, the second storage circuit 546 is shown as a single element, although it is understood that the second storage circuit 546 can be a distribution of storage elements. Also, for illustrative purposes, the navigation system 100 is shown with the second storage circuit 546 as a single hierarchy storage system, although it is understood that the navigation system 100 can include the second storage circuit 546 in a different configuration. For example, the second storage circuit 546 can be formed with different storage technologies forming a memory hierarchal system including different levels of caching, main memory, rotating media, or off-line storage.

The second storage circuit 546 can be a controller of a volatile memory, a nonvolatile memory, an internal memory, an external memory, or a combination thereof. For example, the second storage circuit 546 can be a controller of a nonvolatile storage such as non-volatile random-access memory (NVRAM), Flash memory, disk storage, or a volatile storage such as static random access memory (SRAM).

The second storage interface 548 can receive information from the other functional units/circuits or from external sources, or can transmit information to the other functional units/circuits or to external destinations. The external sources and the external destinations refer to sources and destinations external to the second device 106.

The second storage interface 548 can include different implementations depending on which functional units/circuits or external units/circuits are being interfaced with the second storage circuit 546. The second storage interface 548 can be implemented with technologies and techniques similar to the implementation of the second control interface 544. The second storage circuit 546 can receive semantic frame 114 as updates from the first device 102. The second control circuit 534 can manipulate the semantic frame 114 in order to assemble the semantic grid map 401. Each of the semantic frame 114 includes location information for the frame center 304 and the location of all of the semantic points 310 in the semantic frame 114. By matching the locations of the semantic points 310, the semantic grid map 401 can be assembled by the second control circuit 534.

The second communication circuit 536 can enable external communication to and from the second device 106. For example, the second communication circuit 536 can permit the second device 106 to communicate with the first device 102 over the network 104. By way of an example, the second device 106 can provide the semantic map 120 to the other vehicles that are in or near the region of interest 203 of the first device 102.

The second communication circuit 536 can also function as a communication hub allowing the second device 106 to function as part of the network 104 and not limited to be an endpoint or terminal unit or circuit to the network 104. The second communication circuit 536 can include active and passive circuitry components, such as microelectronics, wireless circuitry, wireline circuitry, analogue circuitry, or an antenna, for interaction with the network 104.

The second communication circuit 536 can include a second communication interface 550. The second communication interface 550 can be used for communication between the second communication circuit 536 and other functional units or circuits in the second device 106. The second communication interface 550) can receive information from the other functional units/circuits or can transmit information to the other functional units or circuits.

The second communication interface 550) can include different implementations depending on which functional units or circuits are being interfaced with the second communication circuit 536. The second communication interface 550 can be implemented with technologies and techniques similar to the implementation of the second control interface 544, including circuitry, waveguides, wireless circuitry, wireline circuitry, analogue circuitry, or a combination thereof.

The second communication circuit 536 can couple with the network 104 to send information to the first device 102, including the semantic map 120 in the second device transmission 510. The first device 102 can receive information in the first communication circuit 516 from the second device transmission 510 of the network 104. The navigation system 100 can be executed by the first control circuit 512, the second control circuit 534, or a combination thereof. For illustrative purposes, the second device 106 is shown with the partition containing the second user interface 538, the second storage circuit 546, the second control circuit 534, and the second communication circuit 536, although it is understood that the second device 106 can include a different partition. For example, the second software 542 can be partitioned differently such that some or all of its function can be in the second control circuit 534 and the second communication circuit 536. Also, the second device 106 can include other functional units or circuits not shown in FIG. 5 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using a gate array, an application specific integrated circuit (ASIC), circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

By way of a further example, the first device 102 can be the autonomous vehicle or the driver assisted vehicle. The first interface circuit 518 can receive input from the optical sensor 108 of FIG. 1, for compiling the semantic frame 114. The semantic frame 114 can be generated by the first control circuit 512 from the optical sensor 108 and the first location circuit 520. The semantic frame 114 can be sent through the first communication circuit 516 and the network 104 to the second device 106 for processing by the second control circuit 534 and the second storage circuit 546.

It has been discovered that the second device 106 can receive the semantic frame 114 from the first device 102 that provides updates for the semantic grid map 401. As an example, the second control circuit 534 can verify the semantic frame 114 and pass the information to the second storage circuit 546 for later analysis. When the second storage circuit 546 contains a completed version of the semantic grid map 401, the second control circuit 534 can filter the noise in order to produce the semantic map 120.

Figure 6:
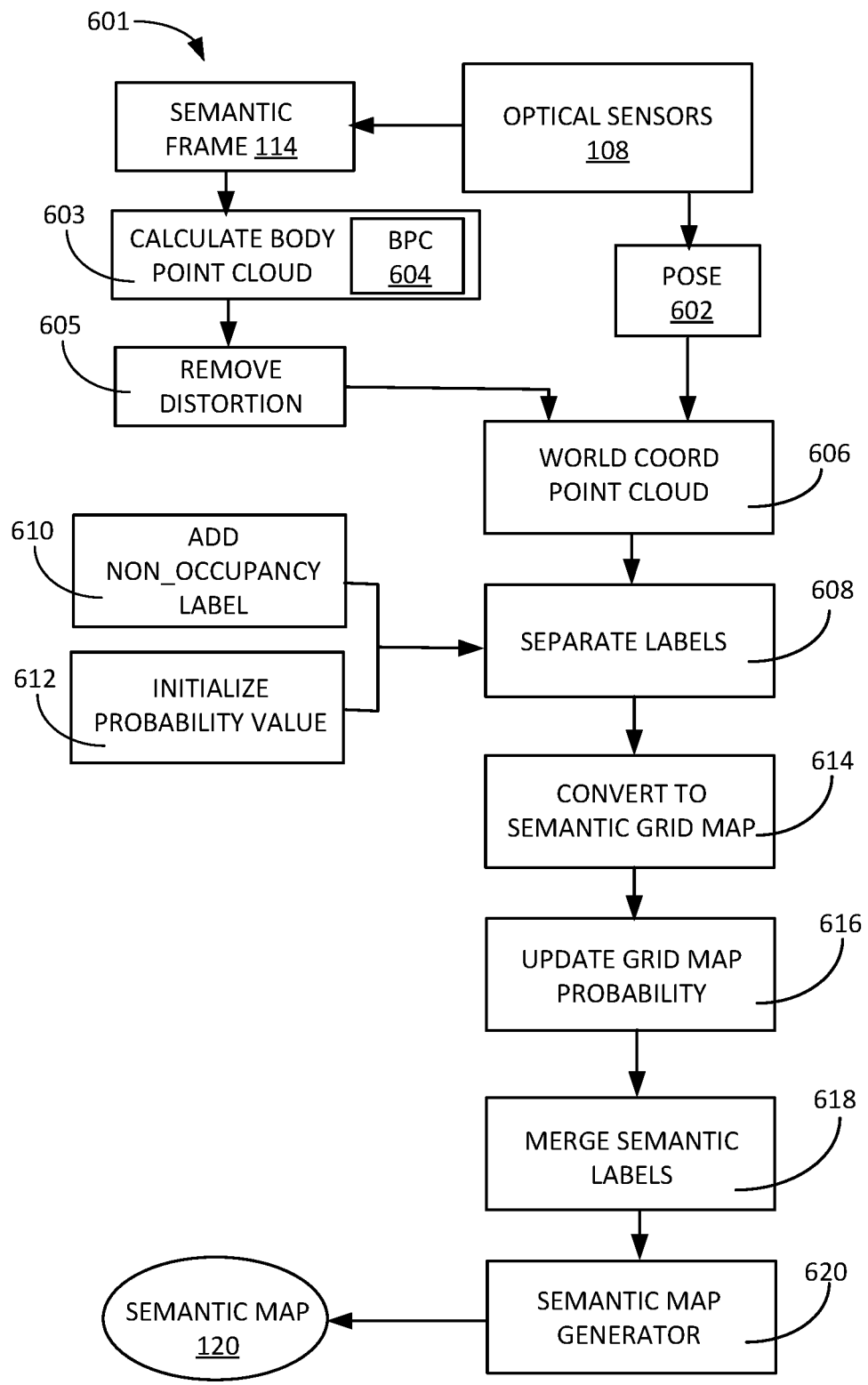
FIG. 6 is exemplary operational flow chart of the navigation system in an embodiment of the present invention.

Referring now to FIG. 6, therein is shown an exemplary operational flow chart 601 of the navigation system 100 of FIG. 1 in an embodiment of the present invention. The exemplary operational flow chart 601 of the navigation system 100 depicts the optical sensors 108 providing detailed information about the roadway 202 Of FIG. 2 to the semantic frame 114. The semantic frame 114 can be assembled in a coordinate system relative to the first device 102 of FIG. 1. The coordinates can be established by counting the semantic points 310 of FIG. 3, such as pixels.

The optical sensors 108 can also provide input to a pose error 602. The pose error 602 can be a position related error caused by the wide-angle lenses of the optical sensors 108 and the related position of the optical sensors on the first device 102. The pose error 602 represents the difference in location and orientation of the optical sensors 108 between successive ones of the semantic frame 114. The pose error 602 must be accounted for when fusing the semantic frames 114 to produce the semantic map 120. The pose error 602 will remain constant as long as the optical sensors 110 are not repositioned. The pose error 602 can be used to correctly identify common artifacts that are observed by more than one of the optical sensors 110.

The semantic frame 114 can be converted by a calculate body point cloud module 603. The calculate body point cloud module 603 can be executed by the first control circuit 512 of FIG. 5. Each of the semantic points 310 has a coordinate calculated relative to the frame center 304 of FIG. 3. The first control circuit 512 can count pixels in order to define the coordinate system of a body point cloud 604. The body point cloud 604 is the identification of every pixel associated with a semantic label for the semantic points 310 in the semantic frame 114.

The semantic frame 114 can be passed to a remove distortion module 605. The remove distortion module 605 can be operated by the first control circuit 512 to remove the outer 10 percent of the semantic points 310 that form the semantic frame 114 by cropping the outer peripheral edge 332 of FIG. 3 of the semantic frame 114. It is understood that the characteristics of the wide-angle lenses adds distortion at the extremities of the view. By way of an example, removing the outer 10 percent of the semantic points 310 that form the semantic frame 114, the major contributors of the distortion can be removed. Since the characteristics of the wide-angle lenses of the optical sensors 110 are constant the regions that are likely to overlap can be quickly learned and corrected.

The remove distortion module 605 and the pose error 602 feed a world coordinate point cloud module 606. The first control circuit 512 of FIG. 5 can retrieve the frame center 304 of FIG. 3 from the first location circuit 520 of FIG. 5 in order to determine the GPS location of the semantic points 310 of FIG. 3 in the semantic frame 114. The pose error 602 can provide correction information for the semantic points 310 that are observed by more than one of the optical sensors 110.

The world coordinate point cloud module 606 can be executed by the first control circuit 512 to provide a real world location for each of the semantic points 310 in the semantic frame 114 and the direction of travel of the first device 102. The first control circuit 512 can access the first location circuit 520 to calculate the real world location of the first device 102, which can be considered as the frame center 304 of FIG. 3. The calculation of the real world location for each of the semantic points 310 can be performed in two major steps. First the first control circuit 512 communicates with the first location circuit 520 to triangulate the location of the first device 102 based on the satellite pseudo ranges provided by the first location circuit 520. The first control circuit 512 can update the location of the semantic points 310 from a body point cloud to the real world location of the semantic points in each of the semantic layers 306. The first control circuit 512 has retrieved the frame center 304 location from the first location circuit 520, the GPS location for each of the semantic points 310 can be calculated and the semantic frame 114 can be generated as the semantic layers 306 with each semantic point 310 on each of the semantic layers 306 with a known GPS location.

The flow than proceeds to a separate labels module 608, in which the first control circuit 512 can separate the semantic layers 306 for analysis. An add non-occupancy label module 610 can be operated by the first control circuit 512 to identify all of the non-occupied cells of the base-level grid 412 of FIG. 4. The addition of the non-occupancy label to the unoccupied cells in each of the semantic frames 306, can update the map, by binary Bayesian update, of the semantic points 310 that reflect the presence of an artifact of the specific one of the semantic frames 306. The input of the add non-occupancy label module 610 to the separate labels module 608 can provide increased access efficiency when searching for the specific ones of the semantic points 310.

An initialize probability value module 612 can be operated by the first control circuit 512 in order to establish an initial probability of identifying the semantic point 310 that must be located.

The initial probability can be calculated based on the probability of detecting an occupied cell in the base-level grid 412 divided by the probability of detecting a non-occupied cell. For each base-level grid 412 of FIG. 4, the occupied probability can be displayed by p(s=1)→p1 and the unoccupied probability can be displayed by p(s=0)→p0. The probability of an occupied one of the base-level grid 412 can be calculated by:

$$\text{Probability } (s) = \frac{p1}{p0} \qquad \text{EQ (1)}$$

Where s in the above equation is the occupancy status of each of the base-level grid 412. It is understood that a map of the base-level grid 412 can be indexed by a two dimensional array, which can support high speed searches, When a map of the upper-level grid 410 of FIG. 4 is searched, a hash index table can be used to reduce memory utilization and increase search speed.

The flow proceeds to a convert to semantic grid map module 614. The first device 102 can transfer the semantic frame 114 to the second device 106 for further processing. The second control circuit 534 can receive the semantic frame 114 and add it to the semantic grid map 401 held in the second storage circuit 546. The second control circuit 534 can align the GPS location of the semantic points 310 at the edge of the semantic frame 114 in order to correctly position it into the semantic grid map 401. Once all of the semantic frames 114 have been collected to complete the semantic grid map 401, the second control circuit 534 can apply the upper-level grid 410 of FIG. 4 and the base-level grid 412 of FIG. 4. The upper-level grid 410 can be parsed with a hash table for accessing the base-level grid 412. This process can utilize less memory and increase access speeds for any device using the semantic map 120 of FIG. 1.

It is understood that the capture of the semantic frame 114 can include noise in each of the semantic layers 306. The noise is generated by transient objects, such as vehicles, pedestrians, temporary structures, temporary signage, or the like that can disrupt the view of a specific one of the semantic layers 306. The noise can be filtered by updating the region of interest 203 of FIG. 2 once the transient objects have moved to a different location.

The flow proceeds to an update grid map probability module 616. The second control circuit 534 can update the probability that the semantic points 310 in the base-level grid 412 are occupied for each of the semantic layers 306. The second control circuit 534 can also calculate the updated probability of occupancy by:

$$\text{Probability } (s/z) = \frac{P(z/s=1)}{P(z/s=0)} \text{Probability } (s) \quad \text{EQ (2)}$$

Where s is the s is the initial state, z is the union of [0, 1] for the update, Probability (s/z) is the updated probability, and Probability (s) is the probability just before the update.

In order to provide a rapid calculation, the second control circuit 534 can calculate the updated probability as a logarithm. The calculation can be performed by hardware assist logic, a math co-processor, software executed by the second control circuit 534, or a combination thereof.

The result can be shown as $$\log (\text{Probability } (s/z)) = \log \frac{P(z/s=1)}{P(z/s=0)} + \log (\text{Probability } (s)) \quad \text{EQ (3)}$$

Which translates to the log of the probability after the update is equal to a measure factor plus the log of the probability prior to the update.

The flow then proceeds to a merge semantic labels module 618. The second control circuit 534 can utilize the probability updates of the semantic layers 306 to assemble the semantic map 120. The second control circuit 534 can select the base-level grid 412 that displays the dominant probability of occupancy from each of the semantic layers 306 for assembly into the semantic map 120. It is understood that dominant probability of occupancy is designated as the one of the semantic layers 306 that has a greater percent of occupancy that any of the other of the semantic layers 306.

The base-level grid 412 can be accessed by a two-level index table, with the upper-level grid 410 accessed by a hash table. and the base-level grid 412 having the remaining details of the semantic points 310 in a GPS location format. It is understood that each of the semantic layers 306 are processed independently, but the upper-level grid 410 addresses a compilation of the semantic layers 306 that represent the structure and markings of the roadway 202 of FIG. 2 and accessing the base-level grid 412 can provide conditions and artifacts with centimeter accuracy.

The flow then proceeds to a semantic map generator module 620 in which the second control circuit 534 can finalize the semantic grid map 401 by assembling all of the base-level grid 412 into the upper-level grid 410 based on the GPS location of each of the semantic points 310. The second control circuit 534 can store the semantic grid map 401 in the second storage circuit 546 for updating and distribution.

The flow then proceeds to the semantic map 120, in which the second control circuit 534 can extract the semantic map 120 for the region of interest 203 represented by the upper-level grid 410 used as a hash table for locating the appropriate one of the base-level grid 412 that contains the detailed position information for the semantic layers 306 in the region of interest 203. The semantic map 120 can be sent to the first device 102 for display and control of the first device 102.

It has been discovered that parsing the semantic map 120 through the combination of the upper-level grid 410 and the base-level grid 412 can provide information about the roadway 202 to a centimeter accuracy, while saving memory space and increasing retrieval speeds. The reduction of noise in the semantic map 120 can enhance the detail of the roadway 202, while also reducing the size of the semantic map 120.

Figure 7:
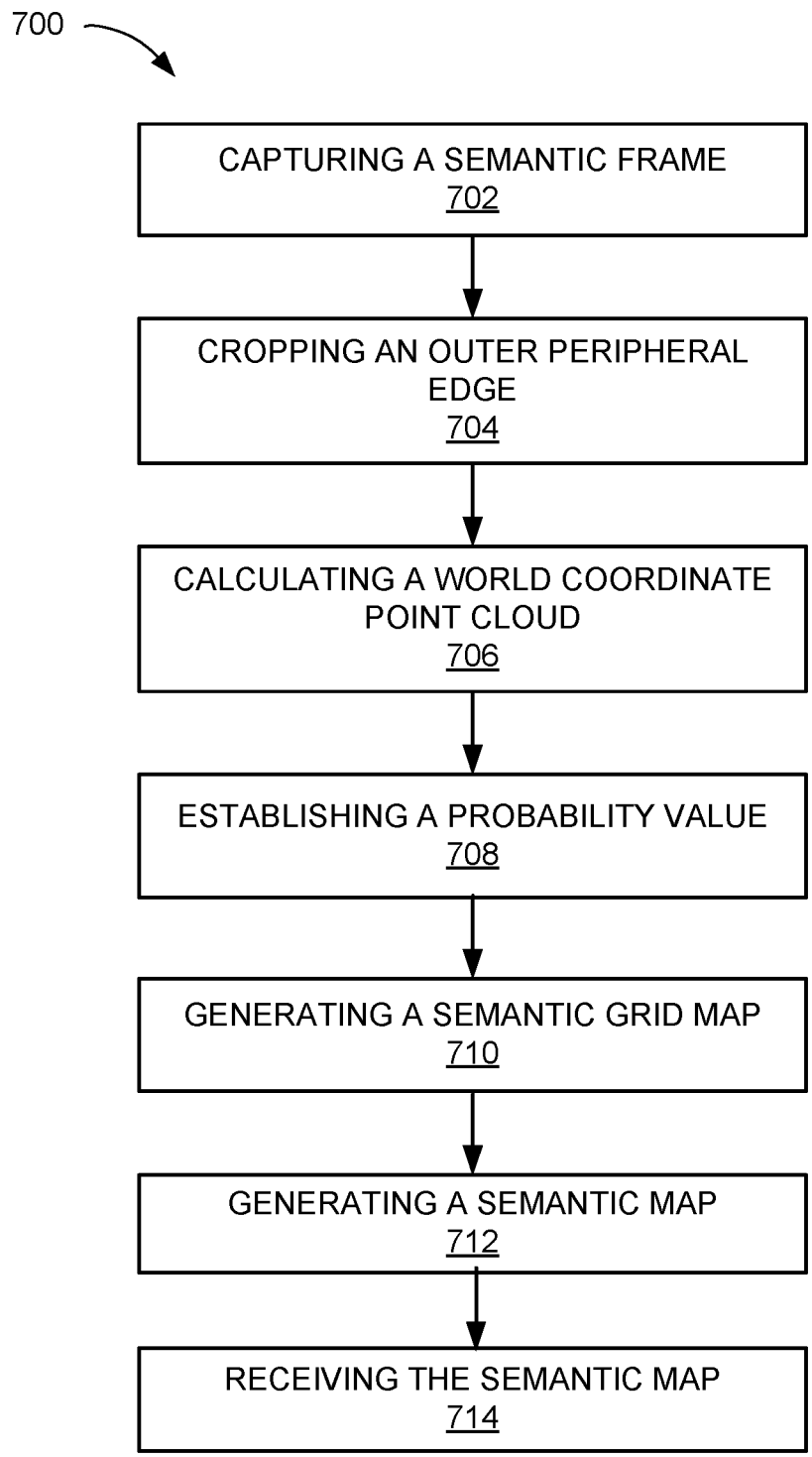
FIG. 7 is a flow chart of a method of operation of a navigation system in an embodiment of the present invention.

Referring now to FIG. 7, therein is shown a flow chart of a method 700 of operation of a navigation system 100 of FIG. 1 in an embodiment of the present invention. The method 700 includes: capturing a semantic frame from a sensor data stream for a region of interest in a block 702; cropping an outer peripheral edge of the semantic frame by removing semantic points beyond the outer peripheral edge in a block 704; calculating a world coordinate point cloud by calculating a global positioning system (GPS) location of the semantic points includes a pose error corrected in a block 706; establishing a probability value for a base-level grid in a block 708; generating a semantic grid map by identifying a dominant percentage of the probability value of the base-level grid and an upper-level grid in a block 710; generating a semantic map from the semantic grid map to represent the region of interest in a block 712; and transmitting the semantic map for displaying on a device in a block 714.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A navigation system comprising:
a control circuit configured to:
capture a semantic frame from a sensor data stream for a region of interest, crop an outer peripheral edge of the semantic frame by removing semantic points beyond the outer peripheral edge, calculate a world coordinate point cloud by calculating a global positioning system (GPS) location of the semantic points includes a pose error corrected, establish a probability value for a base-level grid, generate a semantic grid map by identifying a dominant percentage of the probability value of the base-level grid and an upper-level grid, and generate a semantic map from the semantic grid map to represent the region of interest; and a communication circuit, coupled to the control circuit, configured to transmit the semantic map for displaying on a device.

2. The system as claimed in claim 1 wherein the control circuit is configured to calculate an update grid map probability by calculating a log (Probability (s/z)) (EQ3).

3. The system as claimed in claim 1 wherein the control circuit is configured to capture the semantic frame includes:
identify a frame center of the semantic frame; and
calculate a body point cloud location for the semantic point by counting pixels between the frame center and the semantic point.

4. The system as claimed in claim 1 wherein the control circuit is configured to generate the semantic grid map of the semantic points includes generating the upper-level grid with dimensions of H×H meters and the base-level grid with dimensions of L×L centimeters within the upper-level grid.

5. The system as claimed in claim 1 wherein the control circuit is configured to correct the pose error includes calculating the world coordinate of a semantic point observed by more than one of the optical sensors.

6. The system as claimed in claim 1 wherein the control circuit is configured to capture the semantic frame from a sensor data stream includes a front optical sensor, a rear optical sensor, a left side optical sensor, and a right optical sensor provide the sensor data stream.

7. The system as claimed in claim 1 wherein the control circuit is configured to parse the semantic map through the upper-level grid to the base-level grid provides centimeter accuracy on a roadway.

8. A method of operation for a navigation system comprising:
capturing a semantic frame from a sensor data stream for a region of interest;
cropping an outer peripheral edge of the semantic frame by removing semantic points beyond the outer peripheral edge;
calculating a world coordinate point cloud by calculating a global positioning system (GPS) location of the semantic points includes a pose error corrected;
establishing a probability value for a base-level grid;
generating a semantic grid map by identifying a dominant percentage of the probability value of the base-level grid and an upper-level grid;
generating a semantic map from the semantic grid map to represent the region of interest; and
transmitting the semantic map for displaying on a device.

9. The method as claimed in claim 8 further comprising calculating an update grid map probability by calculating a log (Probability (s/z)) (EQ3).

10. The method as claimed in claim 8 wherein capturing a semantic frame includes:
identifying a frame center of the semantic frame; and
calculating a body point cloud location for the semantic point by counting pixels between the frame center and the semantic point.

11. The method as claimed in claim 8 wherein generating the semantic grid map of the semantic points includes generating the upper-level grid with dimensions of H×H meters and the base-level grid with dimensions of L×L centimeters within the upper-level grid.

12. The method as claimed in claim 8 wherein correcting the pose error includes calculating the GPS location of a semantic point observed by more than one of the optical sensors.

13. The method as claimed in claim 8 wherein capturing a semantic frame from a sensor data stream includes a front optical sensor, a rear optical sensor, a left side optical sensor, and a right optical sensor providing the sensor data stream.

14. The method as claimed in claim 8 further comprising parsing the semantic map through the upper-level grid to the base-level grid provides centimeter accuracy on a roadway.

15. A non-transitory computer readable medium including instructions for a navigation system comprising:
capturing a semantic frame from a sensor data stream for a region of interest;
cropping an outer peripheral edge of the semantic frame by removing semantic points beyond the outer peripheral edge;
calculating a world coordinate point cloud by calculating a global positioning system (GPS) location of the semantic points includes a pose error corrected;
establishing a probability value for a base-level grid;
generating a semantic grid map by identifying a dominant percentage of the probability value of the base-level grid and an upper-level grid;
generating a semantic map from the semantic grid map to represent the region of interest; and
transmitting the semantic map for displaying on a device.

16. The non-transitory computer readable medium including the instructions as claimed in claim 15 further comprising calculating an update grid map probability by calculating a log (Probability (s z)) (EQ3).

17. The non-transitory computer readable medium including the instructions as claimed in claim 15 wherein capturing a semantic frame includes:
identifying a frame center of the semantic frame; and
calculating a body point cloud location for the semantic point by counting pixels between the frame center and the semantic point.

18. The non-transitory computer readable medium including the instructions as claimed in claim 15 wherein generating the semantic grid map of the semantic points includes generating the upper-level grid with dimensions of H×H meters and the base-level grid with dimensions of L×L centimeters within the upper-level grid.

19. The non-transitory computer readable medium including the instructions as claimed in claim 15 wherein correcting the pose error includes calculating the GPS location of a semantic point observed by more than one of the optical sensors.

20. The non-transitory computer readable medium including the instructions as claimed in claim 15 further comprising parsing the semantic map through the upper-level grid to the base-level grid provides centimeter accuracy on a roadway.

* * * * *